United States Patent [19]
Tobioka et al.

[11] Patent Number: 5,692,221
[45] Date of Patent: Nov. 25, 1997

[54] NARROW PROFILE LENS-FITTED FILM UNIT

[75] Inventors: Takashi Tobioka; Junichi Takagi, both of Kanagawa, Japan

[73] Assignee: Fuji Photo Film Co., Ltd., Kanagawa, Japan

[21] Appl. No.: 667,667

[22] Filed: Jun. 21, 1996

[30] Foreign Application Priority Data

Jun. 21, 1995 [JP] Japan .................................. 7-154773

[51] Int. Cl.⁶ ............................ G03B 15/03; G03B 17/02
[52] U.S. Cl. ................................. 396/6; 396/176; 396/535
[58] Field of Search ........................ 354/149.11, 202, 354/288; 396/176, 6, 439, 535

[56] References Cited

U.S. PATENT DOCUMENTS 5,235,364  8/1993  Ohmura et al. ................ 354/149.11
5,353,079  10/1994  Sakai et al. .................... 354/149.11
5,426,478  6/1995  Katagiri ........................ 354/149.11
5,550,607  8/1996  Mizoguchi ..................... 354/149.11
5,555,052  9/1996  Pearson ......................... 354/203

FOREIGN PATENT DOCUMENTS 7-114082  5/1995  Japan .

*Primary Examiner*—Eddie C. Lee
*Attorney, Agent, or Firm*—Young & Thompson

[57] ABSTRACT

A lens-fitted film unit equipped with a built-in electronic flash device having a printed wiring board, formed with a flash circuit thereon and an aperture therein, which is located between a film roll receiving chamber located on one side of an exposure mechanism unit and a front casing section so as to receive partly the film roll receiving chamber in the aperture.

10 Claims, 5 Drawing Sheets

NARROW PROFILE LENS-FITTED FILM UNIT

BACKGROUND OF THE INVENTION

1. Field of the Invention

The present invention relates to a lens-fitted film unit, and, more particularly, to a lens-fitted film unit equipped with a built-in electronic flash.

2. Description of Related Art

Some types of single use or disposable lens-fitted film units which have simple exposure mechanisms and are sold at low prices are equipped with electronic flash devices. Such a single use lens-fitted film unit containing a standard 35 mm type film has only a thickness slightly larger than the diameter of a 35 mm type film patrone and is prominently handy consequently. The utilization of a standard 35 mm type patrone (specified by International Organization for Standard: ISO-1007, 1979 Edition) in the lens-fitted film unit enables the present system of photographic printing apparatuses and associated equipment to make prints from films exposed by the single use lens-fitted film unit at low costs. While the lens-fitted film unit is prominently compact as compared with conventional 35 mm format cameras, there is a great demand for more compactness on the lens-fitted film unit like credit cards and cigarette boxes.

In order to make a lens-fitted film unit more thin and compact, the utilization is made of a nonstandardized film patrone. For instance, the nonstandardized film patrone used in a lens-fitted film unit marketed in the name of "Konica MiNi" (trade name) by Konica Co., Ltd has a diameter 5 mm smaller than that of the conventional 35 mm film patrone. This nonstandardized film patrone is contributory to a decrease in thickness of the lens-fitted film unit.

It is also a recent tendency to incorporate an electronic flash in a lens-fitted film unit. In order for this type of lens-fitted film unit to meet market demands for compactness and low price, the electronic flash must be simple in construction and as small as possible so as to be built in a limited space in the lens-fitted film unit. The lens-fitted film unit with a built-in electronic flash typically comprises a front casing section and a rear casing section between which an exposure unit and a built-in electronic flash device are enclosed. The built-in electronic flash device comprises a flash head and a printed wiring board. The built-in electronic flash device includes a flash tube, a reflector and a diffusion plate. The printed wiring board is provided with various electric parts including a cylindrically elongated battery, battery terminal contacts, a synchronous contact, a cylindrically elongated condenser and a flash charge circuit attached thereto. In order to provide overall compactness of the lens-fitted film unit, components of the built-in electronic flash device are arranged in various spaces separated from one another between the front and rear casing sections. Specifically, the printed wiring board, which is held by the internal base section, is located in front of a film roll receiving chamber for a roll of unexposed film formed in an internal base section on one side of the exposure unit installed to the internal base section. The flash head is located above the top of the film roll receiving chamber. The battery is received in a vertical battery chamber located on one side of the film roll receiving chamber remote from the exposure unit. Further, the condenser is laid down under the exposure unit. A flash charge switch attached to the front casing section is operated to short a flash charge circuit formed on the printed wiring board.

The lens-fitted film unit having the arrangement of components is not always satisfactorily compact. One of factors which influence the compactness, in particular thickness, of the lens-fitted film unit is the total thickness of the built-in electronic flash device and the patrone receiving chamber or the film roll receiving chamber. An arrangement of components realizing the overall compactness of a lens-fitted film unit equipped with a built-in electronic flash device is described in, for instance Japanese Unexamined Patent Application filed by the inventor of this application. While this component arrangement provides overall compactness of the lens-fitted film unit by forming a grip around the patrone receiving chamber, it is still hard to provide the lens-fitted film unit which is satisfactorily thin excepting the grip section as long as the printed wiring board is located in front of the film roll receiving chamber.

In recent years, there has been proposed what is called an advanced photographic system in which unique film patrones described in, for instance, U.S. Pat. Nos. 4,634,306 and 4,832,275 and Japanese Unexamined Patent Publication No. 3-37645 are used. The unique film patrone of this type has a rotary spool around which a new format of film strip is fully wound from end to end and rotation of which causes movement of the film strip into and out of the film patrone. This film has a film substratum for supporting emulsion layers, made of a triacetate web, a polyester web, polyphenylenenaphtalate web or a polycarbonate web, which has a width of approximately 24 mm and a thickness of approximately 0.07 to 0.15 mm. The film strip is not always coated with a back layer but a magnetic recording layer, an electrically chargeable recording layer and a layer of nitrocellulose, diacetylcellulose, triacetylcellulose, gelatin or polycarbonate, each being mixed with an antielectrification agent, an electric conductive material and lubricant. While this film strip having a film width smaller than the conventional 35 mm type of film strips defined by International Organization for Standard provides compactness of the unique film patrone, if it is wound into a roll less in diameter than approximately 11 mm, it tends to curl due to its relatively strong stiffness and consequently becomes hard to be forced out of the film patrone through rotation of the spool.

Accordingly, if a lens-fitted film unit is loaded with the unique film patrone with the new format film strip developed for used with the advanced photographic system, it is difficult to provide a great reduction in thickness of the lens-fitted film unit, as long as a printed wiring board forming a part of the electronic flash device is located in front of a film roll receiving chamber, due to the diameter of the film roll receiving chamber which must be greater than 11 mm.

A lens-fitted film unit described in, for instance, Japanese Unexamined Patent Publication No. 6-258775 has a printed wiring board forming a part of the electronic flash device which is located in a space between an exposure unit and a film roll receiving chamber. While the lens-fitted film unit is reduced in thickness, it must have a large overall length from side to side.

SUMMARY OF THE INVENTION

It is an object of this invention to provide a lens-fitted film unit with a unique film patrone developed for the advanced photographic system which has an improved printed wiring board forming a part of an electronic flash device built-in the lens-fitted film unit.

It is another object of the invention to provide a lens-fitted film unit with a unique film patrone developed for the advanced photographic system which has a reduced overall length from side to side.

These objects of the invention are achieved by providing a lens-fitted film unit which has an exposure unit including a taking lens and an exposure mechanism unit, a film patrone receiving chamber for receiving the film patrone therein located on one side of the exposure unit, a film roll receiving chamber for receiving a roll of unexposed film strip therein located on another side of the exposure unit, all being enclosed between front and rear halves of a casing, and is loaded with a film patrone for a film strip having a width of approximately 24 mm developed for use with an advanced photographic system and a built-in electronic flash device. The built-in electronic flash device comprises a flash head including at least a flash tube and located above the film roll receiving chamber, and a printed wiring board, having a flash circuit formed thereon and located between the film roll receiving chamber and the front casing section, which is provided with means for receiving front part of the film roll receiving chamber therein.

The printed wiring board may be formed with an aperture as the means to receive partly the film roll receiving chamber therein or may comprise two separate boards connected by the flash head so as to form an aperture as the means between the two separate boards to receive partly the film roll receiving chamber therebetween. Alternatively, the printed wiring board at its back may be formed with a concavity as the means in which the film roll receiving chamber is partly seated.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE SPECIFIC EMBODIMENTS

Figure 1:
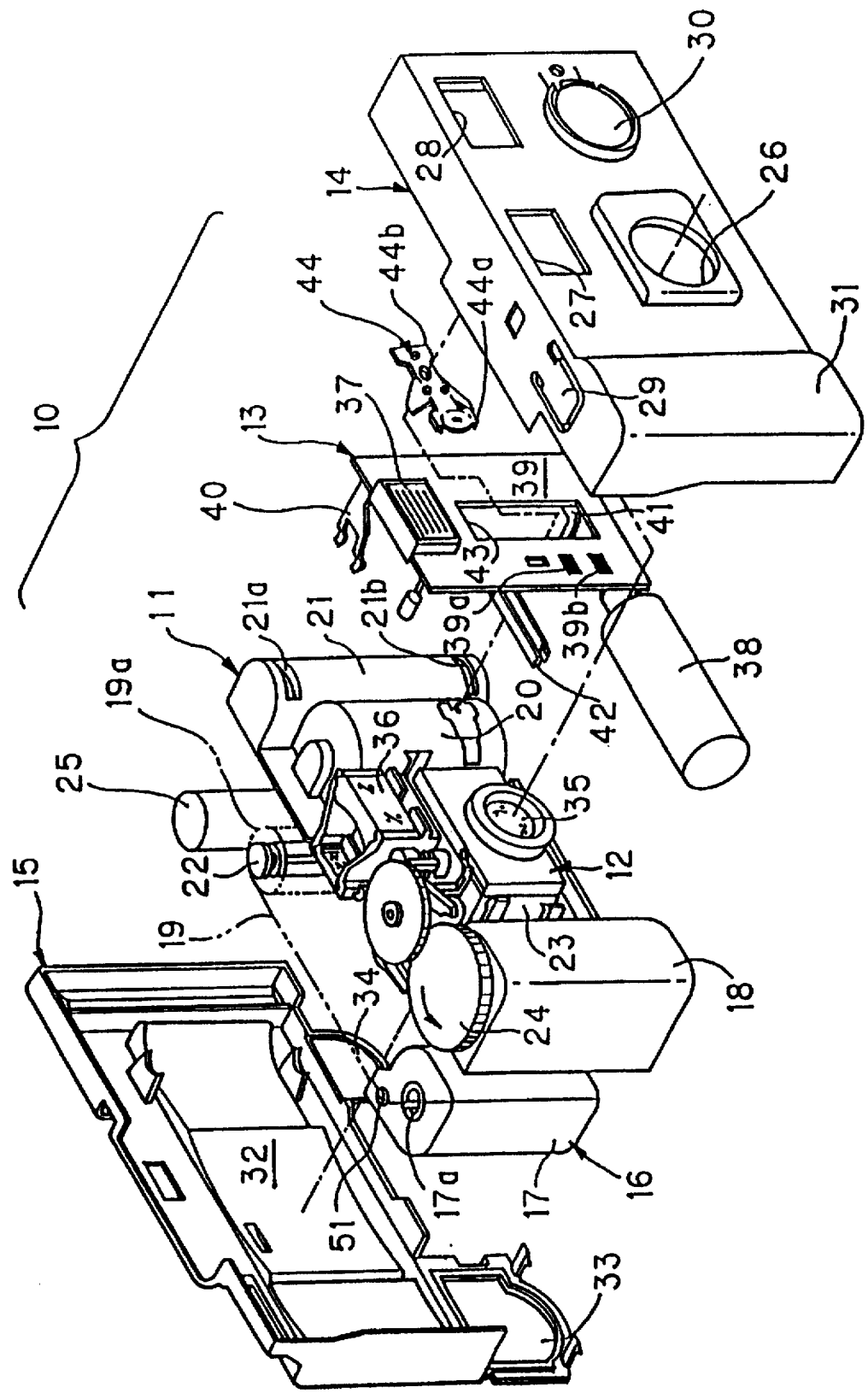
FIG. 1 is an exploded perspective view of a lens-fitted film unit in accordance with an embodiment of the invention.

Referring to the drawings in detail, in particular, to FIG. 1, a lens-fitted film unit 10 is loaded with a unique film patrone, having a roll of film strip different in format from the conventional films, developed for the advanced photographic system. The lens-fitted film unit 10 comprises a front casing section 14 and a rear casing section 15 between which an internal base section 11, an exposure unit 12, an electronic flash unit 13 are disposed. The internal base section 11 is provided with an exposure chamber 23 and is formed with an open-bottomed patrone receiving chamber 18 for a film patrone 17 located at one end side of the exposure chamber 23, an open-bottomed roll film receiving chamber 20 for receiving an unexposed film roll 19a withdrawn from the film patrone 17 located at another end side of the exposure chamber 23, and a battery chamber 21 for receiving a battery 25 on one side of the roll film receiving chamber 20 remote from the exposure chamber 23. A film strip 19 secured to a spool 17a in the film patrone 17 at one end is previously withdrawn and wound into an unexposed film roll 19a around a spool 22 located in the interior of the film roll receiving chamber 20. The film unit 16 has a film strip 19 which is completely wound around the spool 17a in the film patrone 17. Rotation of the spool 17a forces the film strip 19 out of the film patrone 17.

The film strip 19 has a film format different from the 35 mm film format specified by International Organization for Standard and has a width smaller than that of the 35 mm type film. While the film format enables the film patrone 17 to be miniaturized as compared with the conventional 35 mm type film patrone, some structural constraints must be imposed on the film patrone 17. That is, because, as described previously, if the film strip 19 is wound into a roll less in diameter than 11 mm, it is apt to curl due to its relatively strong stiffness, becoming hard to be pushed out of the film patrone 17. For this reason, the film roll film receiving chamber 20 is adapted to receive a film roll 19a greater in diameter than 11 mm. On the other hand, the patrone receiving chamber 18 is larger than the film roll film receiving chamber 20 and projects toward the front casing section 14 more in a direction of thickness of the lens-fitted film unit 10 than the film roll film receiving chamber 20. The exposure chamber 23 is formed with an exposure aperture frame for defining an image area at its back. At the top of the patrone receiving chamber 18 there is provided a film advance knob 24 having a rotational spool driver (not shown) in engagement with the spool 17a of the film patrone 17. The film advance knob 24 is rotated in a counterclockwise direction as viewed in FIG. 1 to rewind successive exposed frames of the film strip 19 into the film patrone 17. The battery chamber 21 receives a battery 25 erected vertically therein.

The front casing section 14 is formed with openings or windows, namely a taking lens window 26 in which a taking lens 35 is positioned, a viewfinder window with an objective lens through which a subject to be photographed is viewed, and a flash window 28 in which a flash head 37 is positioned and is formed with a shutter release button 29 and a flash charge switch button 30. These buttons 29 and 30 are formed as integral parts of the front casing section 14. The front casing section 14 at one end is shaped to project forward in conformity with the patrone receiving chamber 18 so as to provide a space for accommodation of the patrone receiving chamber 18. This projected section 31 of the front casing section 18 provides a secure grip during photographing. The rear casing section 15 is formed integrally with a film support surface 32 covering the exposure aperture frame of the exposure chamber 23, and bottom lids 33 and 34 for closing bottoms of the patrone receiving and film roll receiving chambers 18 and 20, respectively. The bottom lid 33 is opened to remove the film patrone 17 from the patrone receiving chamber 18 after having rewound the film strip 19 fully into the film patrone 17.

The exposure unit 12 incorporates various mechanisms, such as an exposure counting mechanism, a film metering mechanism, a shutter mechanism which may take any type of mechanisms well known in the art, and is provided with a taking lens 35 and a viewfinder optical system 36 secured to the exposure chamber 23. The exposure chamber 23 may be divided into two parts, one of which is integrated with the internal base section 11 and the remaining part of which is united with some parts of the exposure unit 12 and detachably secured to the exposure chamber 23. The viewfinder optical system 36 may be incorporated not in the exposure unit 12 but in the front casing section 14.

The electronic flash device 13 comprises a flash head 37 and electric parts forming a flash circuit, including a condenser 38, battery terminal contacts 40 and 41 and a synchronous contact 42, which are attached to a printed wiring board 39 located between the front casing section 14 and the internal base section 11. The printed wiring board 39 is formed with a rectangular aperture 43 sufficiently large to receive partly the film roll receiving chamber 20 therein. This printed wiring board 39 is secured to the internal base section 11 such that an imaginary plane in contact with the foremost outer surface of the film roll receiving chamber 20 is at least even with the front surface of the printed wiring board 39 or the film roll receiving chamber 20 projects forward from the front surface of the printed wiring board 39, the flash head 37 is located over the top of the film roll receiving chamber 20, the battery terminal contacts 40 and 41 enter the interior of the battery chamber 21 through openings 21a and 21b, and the condenser 38 is laid down under the exposure unit 12.

A elastic contact arm 44 is held at its one end 44b between the film roll receiving chamber 20 and the front casing section 14 and in engagement with a bendable contact member 44 at another end 44a. When the flash charge button 30 is pressed down, it bends the elastic contact arm 44 and brings the end 44a in contact with terminals 39a and 39b to short a flash charge circuit formed on the printed wiring board 39.

Figure 2:
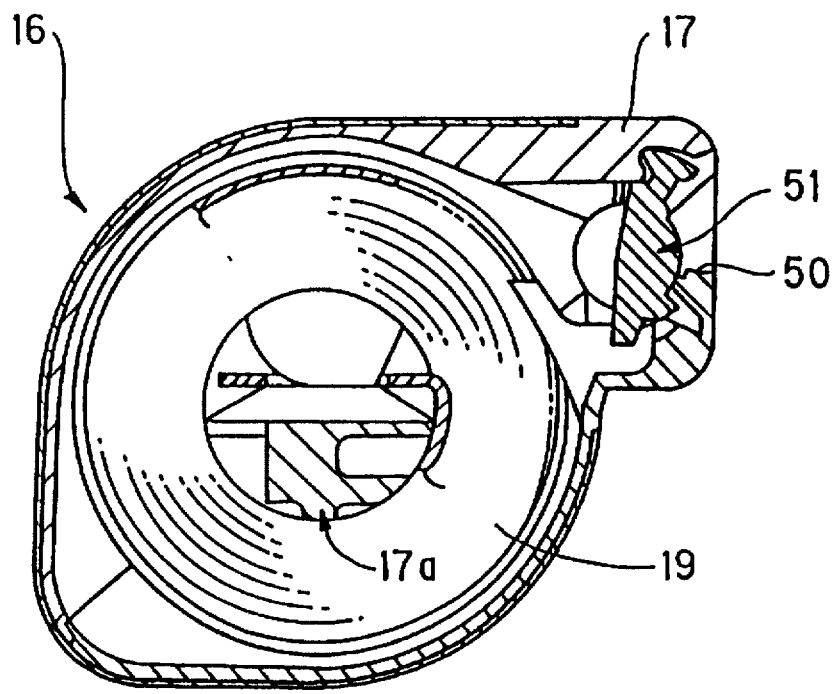
FIG. 2 is a cross-sectional view of a film patrone with a light lock door used in the advanced photographic system in a closed position.
Figure 3:
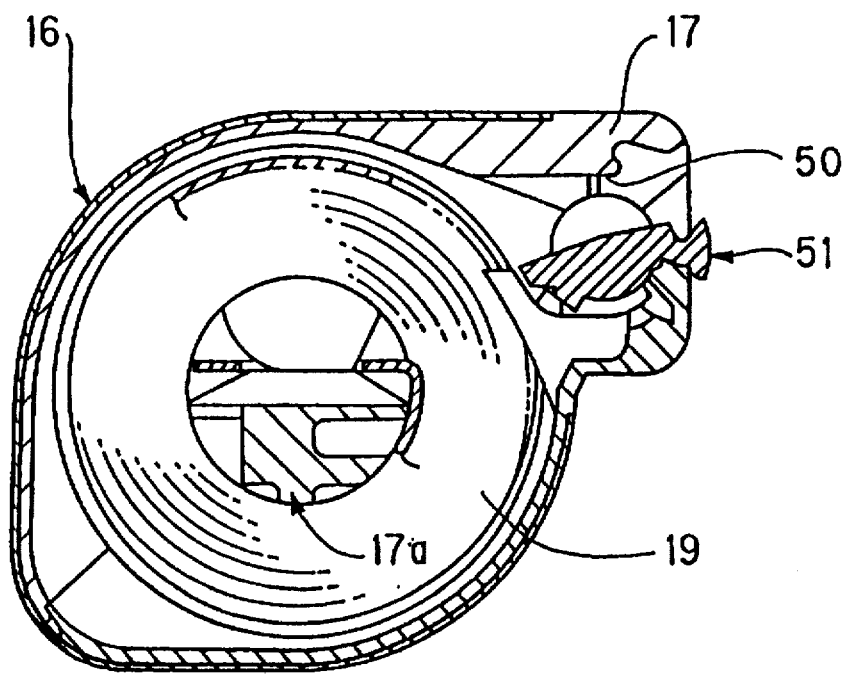
FIG. 3 is a cross-sectional view of the film patrone with a light lock door in an open position.

Referring to FIGS. 2 and 3 showing the film unit 16 comprising a film patrone 17 and a film strip 19 wound into a roll therein, the film patrone 17 has a film egress/ingress slot 50 and a light block door 51. The light block door 51 is rotatable between a closed position (FIG. 2) where it prevents ambient light from entering the film patrone 17 through the film egress/ingress slot 50 and an open position (FIG. 3) where it allows movement of the film strip 19 to be forced into and out of the film patrone 17 through the film egress/ingress slot 50. The light lock door 51 at its one end is formed with a key groove (not shown) which is accessible by a key 52a of a door drive disk 52 (see FIG. 4) from the exterior of the film patrone 17.

Figure 4:
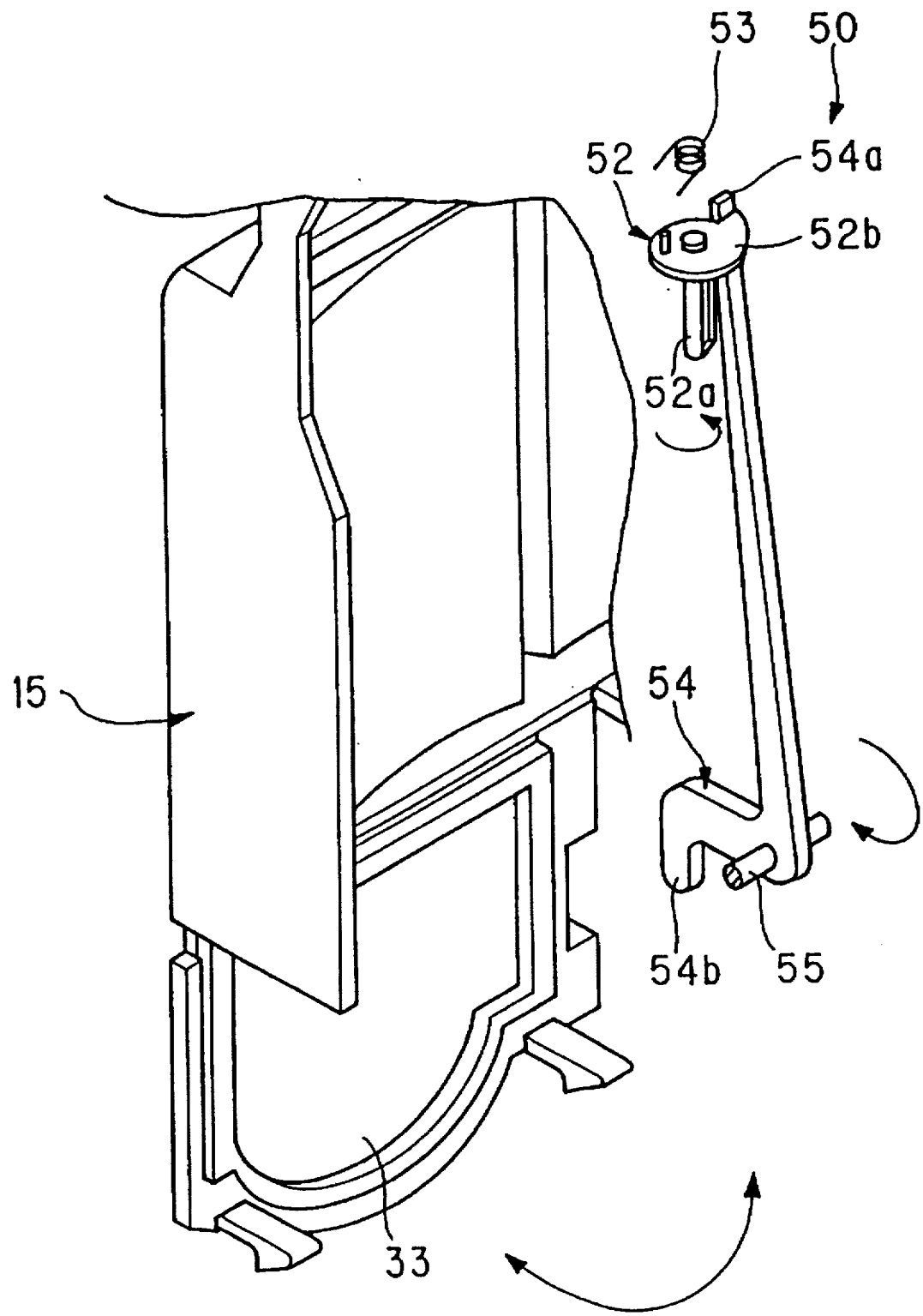
FIG. 4 is a perspective view of a light lock door drive mechanism of the film patrone shown in FIGS. 2 and 3.

FIG. 4 shows a door drive mechanism 50 located in a space between the patrone receiving chamber 18. The door drive mechanism 50 is linked with the bottom lid 33 of the patrone receiving chamber 18 to rotate the light lock door 51 following opening and closing the bottom lid 33. Specifically, the door drive mechanism 50 comprises a door drive disk 52, a return spring 53 and a link lever 54. The door drive disk 52 is provided with a key 52a projecting into the interior of the film patrone receiving chamber 18 and engageable with the key groove of the light lock door 51 and formed with a lip 52b engaged by one end of the link lever 54. The key 52a of the door drive disk 52 is brought into engagement with the key groove of the light lock door 51 when the film patrone 17 is loaded in the patrone receiving chamber 18. The link lever 54 is pivotally mounted at another end on a pivot shaft 55 projecting outside from the patrone receiving chamber 18 and has an L-shaped arm 54b located in a path of movement of the bottom lid 33. During closing the bottom lid 33, the L-shaped arm 54b is engaged and pushed, by the bottom lid 33, pivoting the link lever 54 around the pivot shaft 55 in a clockwise direction as viewed in FIG. 4. As a result, the link lever 54 turns the door drive disk 52 in a counterclockwise direction against the return spring 53 to turn the light lock door 51 of the film patrone 17 to the open position through the engagement of the key 52a with the key groove of the light lock door 51 following closing the bottom lid 33 of the patrone receiving chamber 18. In reverse way, when the bottom lid 33 of the patrone receiving chamber 18, since the link lever 54 is allowed to pivot in a counterclockwise direction, the door drive disk 52 is forced in the clockwise direction by the return spring 53, turning the light lock door 51 of the film patrone 17 to the closed position through the engagement of the key 52a with the key groove of the light lock door 51 following opening the bottom lid 33 of the patrone receiving chamber 18.

Figure 5:
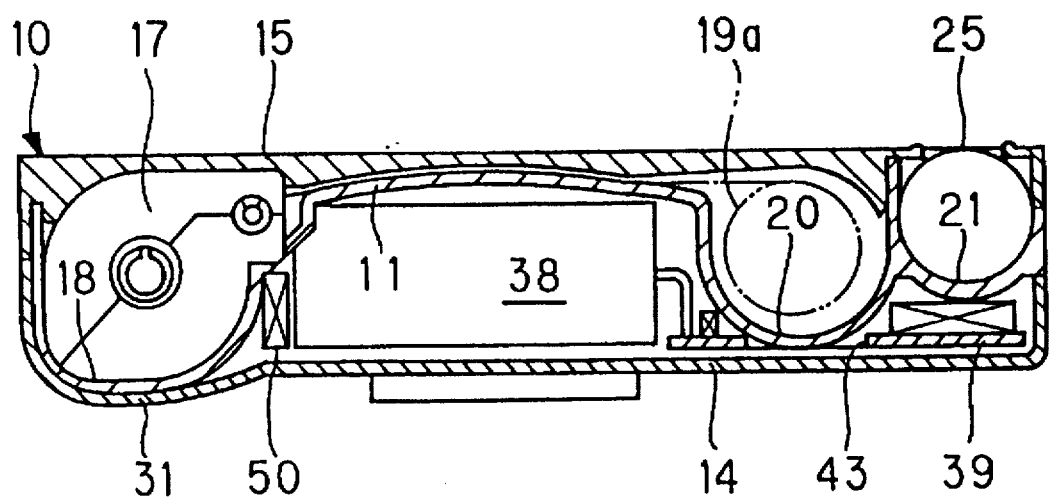
FIG. 5 is a cross-sectional view of the lens-fitted film unit of FIG. 1.
Figure 6:
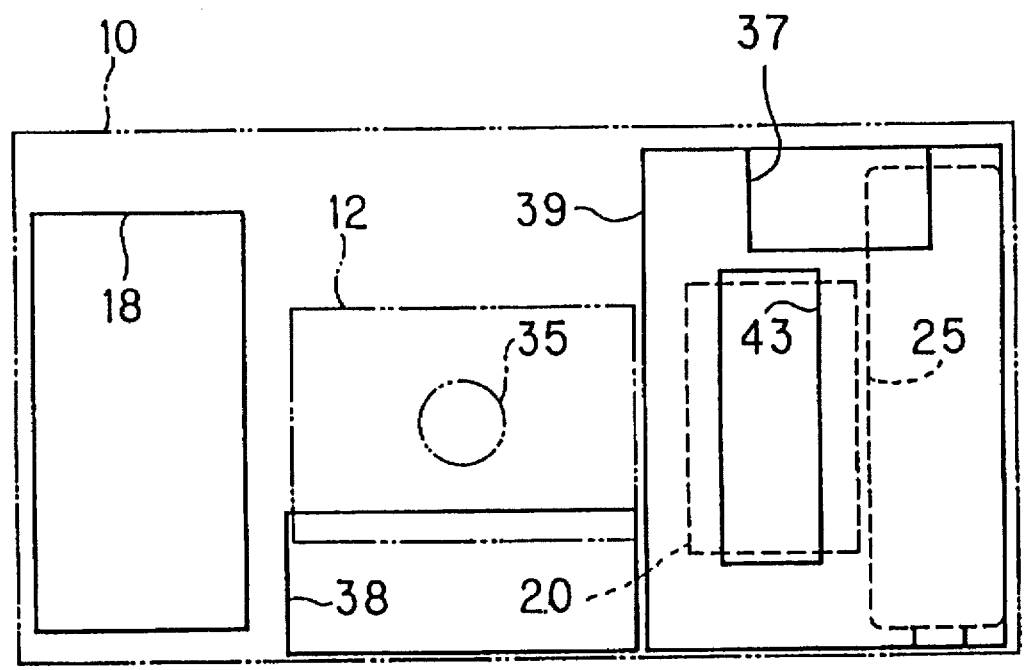
FIG. 6 is a front view of the lens-fitted film unit of FIG. 1 showing arrangement of internal components.

As shown in FIGS. 5 and 6, the printed wiring board 39 surrounds and extends on all sides of a part of the film roll receiving chamber 20 enclosed within the aperture 43 and is arranged such that the printed wiring board 39 places its front surface behind an imaginary plane in contact with the foremost outer surface of the film roll receiving chamber 20. This arrangement of the printed wiring board 39 produces a reduction in overall thickness of the lens-fitted film unit by at least the thickness of the printed wiring board 39 including weld beads. Further, the electric parts are arranged on opposite parts of the printed wiring board 39 divided on both sides of the aperture 43 and located spaces left between the exposure unit 12 and the film roll receiving chamber 20 and in front of the battery chamber 21, respectively, with the effect of preventing the lens-fitted film unit from getting longer from side to side.

The printed wiring board 39 may be formed with an open-ended aperture, such as an U-shaped aperture or an inverted U-shaped aperture, to receive partly the film roll receiving chamber 20 therein.

Figure 7:
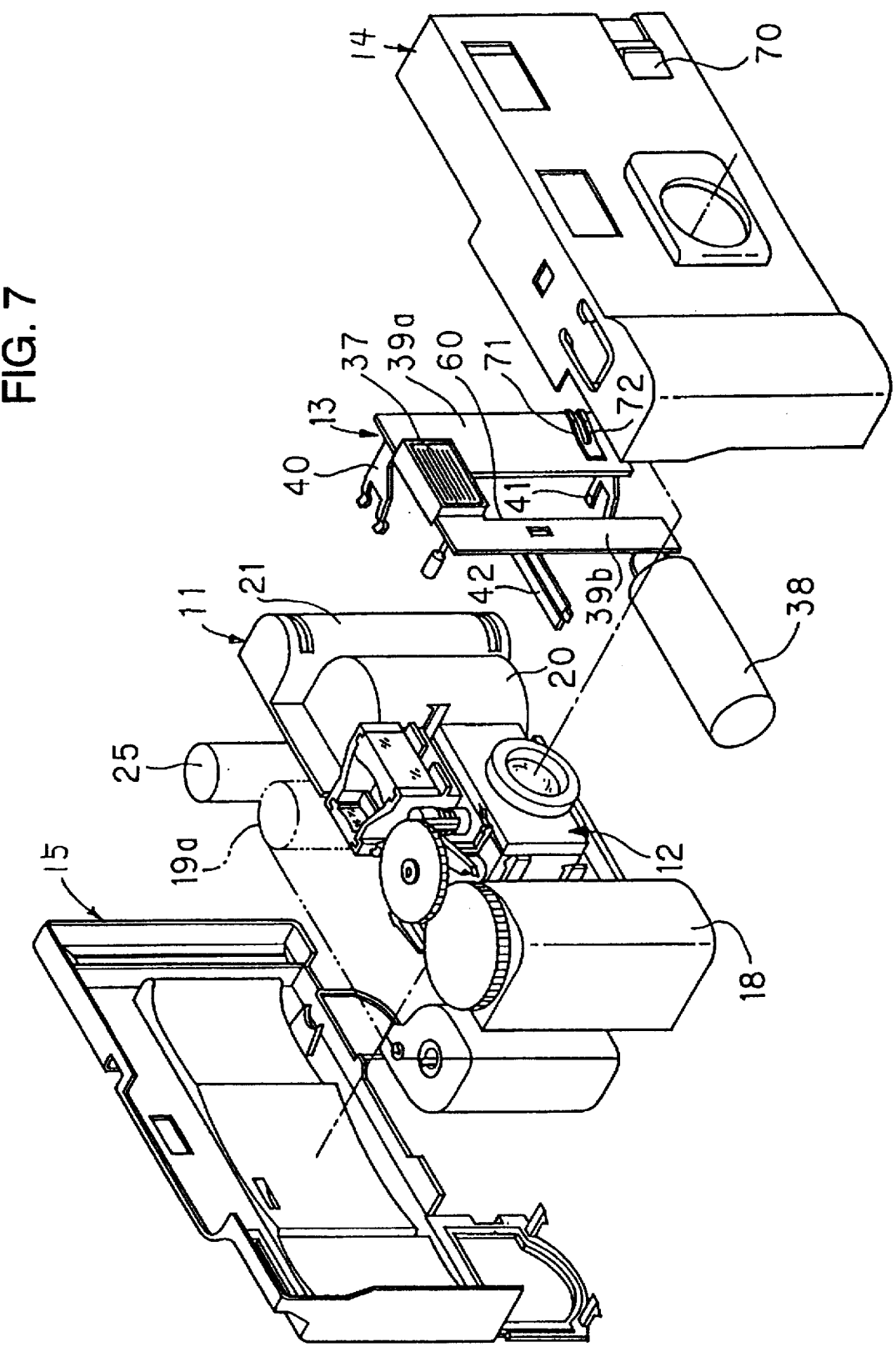
FIG. 7 is an exploded perspective view of a lens-fitted film unit in accordance with another embodiment of the invention.

FIG. 7 shows a lens-fitted film unit in accordance with another embodiment of the invention in which a printed wiring board 39 is divided into two parts 39a and 39b which are secured to a flash head 37 as one unit and electrically connected by means of a jumper wire or an electrically conductive member disposed in the flash head 37. The printed wiring board 39 is installed such that the parts 39a and 39b are located at a distance on opposite sides of a film roll receiving chamber 20 and behind an imaginary plane in contact with the foremost outer surface of the film roll receiving chamber 20 so as to provide a space in which the film roll receiving chamber 20 is partly placed.

In the lens-fitted film unit shown in FIG. 7, the film strip 19 is wound into a roll 19a without using a spool and located in the film roll chamber 20. A flash charge switch is formed as a slide knob 70 installed to the front casing section 14 and a contact leg (not shown) attached to the slide knob 70 for shorting terminals 71 and 72 of a flash charge circuit on the printed wiring board 39a and 39b.

Although, in the lens-fitted film unit depicted in FIG. 1 or 7 and described in detail above, the battery 25 and the condenser 38 are located on the outer side of the film roll receiving chamber 20 and under the exposure unit 12, respectively, they may, however, be reversed. Further, instead of forming a rectangular aperture 40 in the printed wiring board 39 or connecting two separate parts 39a and 39b of the printed wiring board 39 with a space left therebetween, the printed wiring board 39 at the back side may be shaved to form a concavity in conformity with the outer appearance of front part of the film roll receiving chamber 20. In this case the printed wiring board 39 is attached to the film roll receiving chamber 20 so as to receive the front part of the film roll receiving chamber 20 in the concavity. This printed wiring board 39 is simple in configuration and easily fabricated.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A lens-fitted film unit equipped with a built-in electronic flash device, said lens-fitted film unit being provided with an exposure unit including a taking lens and an exposure mechanism, a film patron receiving chamber located on one side of the exposure unit and a film roll receiving chamber located on another side of the exposure unit, said film roll receiving chamber having a curved front face, all of which are enclosed between front and rear halves of a casing, said electronic flash device comprising:

a flash head including at least a flash tube;

a printed wiring board on which a flash circuit electrically connected to said flash tube is formed and which is provided with means for receiving said curved front face of said film roll receiving chamber therein.

2. A lens-fitted film unit as defined in claim 1, wherein said printed wiring board is formed with an aperture as said means.

3. A lens fitted film unit as defined in claim 2, wherein said aperture comprises a vertically elongated slot.

4. A lens-fitted film unit as defined in claim 1, wherein said printed wiring board comprising two separate boards connected by said flash head so as to form an aperture as said means between said two separate boards.

5. A lens-fitted film unit as defined in claim 1, wherein said printed wiring board at said printed wiring board's back is formed with a concavity as said means.

6. A lens-fitted film unit loaded with a film patron for a film strip having a width of approximately 24 mm developed for use with an advanced photographic system, said lens-fitted film unit having an exposure unit including a taking lens and an exposure mechanism unit, a film patron receiving chamber for receiving said film patron therein located on one side of the exposure unit, a film roll receiving chamber for receiving a roll of unexposed film strip therein located on another side of the exposure unit, said film roll receiving chamber having a curved front face, and a built-in electronic flash device, all of which are enclosed between front and rear halves of a casing, said electronic flash device comprising:

a flash head including at least a flash tube, said flash head being located above said film roll receiving chamber;

a cylindrical battery located vertically on one side of said film roll receiving chamber;

a cylindrical condenser laid down below said exposure mechanism unit; and a printed wiring board which has a flash circuit electrically connected to said flash tube formed thereon and battery terminal contacts in contact with terminals of said battery and to which said condenser is attached, said printed wiring board being provided with means for receiving said curved front face of said film roll receiving chamber therein.

7. A lens-fitted film unit as defined in claim 6, wherein said printed wiring board is formed with an aperture as said means.

8. A lens-fitted film unit as defined in claim 7, wherein said aperture comprises a vertically elongated slot.

9. A lens-fitted unit as defined in claim 6, wherein said printed wiring board comprising two separate boards connected by said flash head so as to form an aperture as said means between said two separate boards.

10. A lens-fitted film unit as defined in claim 6, wherein said printed wiring board at said printed wiring board's back is formed with a concavity as said means.

* * * * *